US005451780A

United States Patent [19]

Laser

[11] Patent Number: 5,451,780

[45] Date of Patent: Sep. 19, 1995

[54] DEVICE FOR SETTING SLIT WIDTHS IN THE BEAM PATH OF SPECTROMETERS

[75] Inventor: Bernd Laser, Stuhr, Germany

[73] Assignee: Finnigan MAT GmbH, Breman, Germany

[21] Appl. No.: 294,099

[22] Filed: Aug. 22, 1994

[30] Foreign Application Priority Data

Aug. 31, 1993 [DE] Germany ........................ 43 29 221.6

[51] Int. Cl.$^6$ .......................... H01J 49/06; G01J 3/04; G02B 26/02

[52] U.S. Cl. .................................... 250/281; 356/330; 356/331; 359/232; 359/233; 359/227

[58] Field of Search ................ 250/281; 356/330, 331, 356/332, 333; 359/227, 232, 233

[56] References Cited

U.S. PATENT DOCUMENTS

| | | | |
|---|---|---|---|
| 2,914,987 | 12/1959 | Crosswhite | 350/271 |
| 3,209,143 | 9/1965 | Hickam | 250/281 |
| 3,346,737 | 10/1967 | Neuhaus . | |
| 3,469,094 | 9/1969 | Erickson | 250/281 |
| 3,643,435 | 2/1972 | Klee . | |
| 3,655,963 | 3/1972 | Brunnee | 250/281 |
| 4,213,051 | 7/1980 | Struthoff | 250/281 |
| 4,240,298 | 12/1980 | Wetterhorn . | |
| 4,612,440 | 9/1986 | Brunnée | 250/281 |

FOREIGN PATENT DOCUMENTS

| | | | |
|---|---|---|---|
| 1144497 | 2/1963 | Germany . | |
| 1498542 | 4/1969 | Germany . | |
| 1812625 | 6/1970 | Germany . | |
| 1648807 | 5/1971 | Germany . | |
| 3332949 | 4/1985 | Germany . | |
| 0003844 | 1/1985 | Japan | 250/281 |
| 0180054 | 9/1985 | Japan | 250/281 |
| 350814 | 1/1961 | Switzerland . | |
| 0774842 | 5/1957 | United Kingdom . | |

OTHER PUBLICATIONS

German Search Report, 03 Feb. 1994.

*Primary Examiner*—Constantine Hannaher
*Assistant Examiner*—Virgil O. Tyler
*Attorney, Agent, or Firm*—Flehr, Hohbach, Test, Albritton & Herbert

[57] ABSTRACT

A slit is disposed as diaphragm in the beam path of a mass spectrometer. The slit width is to be variable in the simplest possible manner. Manual, electric motor-driven, thermoelectric or piezoelectric adjustment devices are known. According to the invention a pneumatic adjustment is provided. A Bourdon tube (12) moves a lever (14), at one end (18) of which slits (19, 20, 21) of differing slit widths are disposed. The lever movements are limited by abutments (22, 23).

8 Claims, 4 Drawing Sheets

DEVICE FOR SETTING SLIT WIDTHS IN THE BEAM PATH OF SPECTROMETERS

The invention relates to a device for setting the slit widths of slit devices in the beam path of spectrometers, especially mass spectrometers, having a slit, the width of which is variable, or having selectively settable slits of differing widths, and having a gearing or the like for moving the slits or for setting the same.

BACKGROUND OF THE INVENTION

A slit device is usually disposed in the beam path of a spectrometer for analysing organic or inorganic substances, especially in a mass spectrometer. This slit device represents a defined limitation for the beam and is to mask out a part of the beam. For differing analysis purposes, an alteration of the slit width or, generally, an adaptation of the slit is necessary. Such adaptations take place by means of the exchange of the slits or by the alteration of the slit width. In the latter case, a lateral limitation of the slit, a slit jaw (or both) is adjusted.

Known adjustment mechanisms operate, for example, with a threaded rod, which is rotatable manually or by an electric motor, for moving a slit jaw. Also known is the adjustment of the slit width by altering the length of a wire through which a current flows and which as a result alters its temperature, cf. DE-A 18 12 625. Furthermore, the slit adjustment by piezoelectric elements has already been carried out, e.g. in DE-A 33 32 949. The trend is towards technically costly and delicate solutions. Each one of the known solutions exhibits characteristic disadvantages. The adjustment by means of a threaded rod is problematic, since the slit device operates under vacuum conditions in continuous operation. Accordingly, sealing problems arise. The adjustment by a wire through which a current flows and which heats up takes place only slowly and is not sufficiently stable. Piezoelectric adjustment is costly and demands extremely stable voltages.

OBJECT AND SUMMARY OF THE INVENTION

In contrast to this, the object of the present invention is to provide a simple and sturdy adjustment possibility for setting slit devices.

According to the invention, the object is achieved in that a pneumatically actuable regulating unit is associated with the gearing. The technology required for this purpose is known and developed. It is possible to achieve defined adjustment paths in a very short time. The arrangement of pneumatic elements in a vacuum is not problematic.

Particularly advantageous is the adjustment of the slit device with the aid of a Bourdon tube. Preferably, a lever articulated thereto is movable to and fro between abutments. In this case, the lever can at the same time be a carrier of slits of differing widths or however can move a slit jaw.

Further features of the invention are evident from the individual claims. Advantageous embodiments of the invention are explained in greater detail hereinbelow with reference to drawings.

DESCRIPTION OF THE PREFERRED EMBODIMENTS

Figure 1:
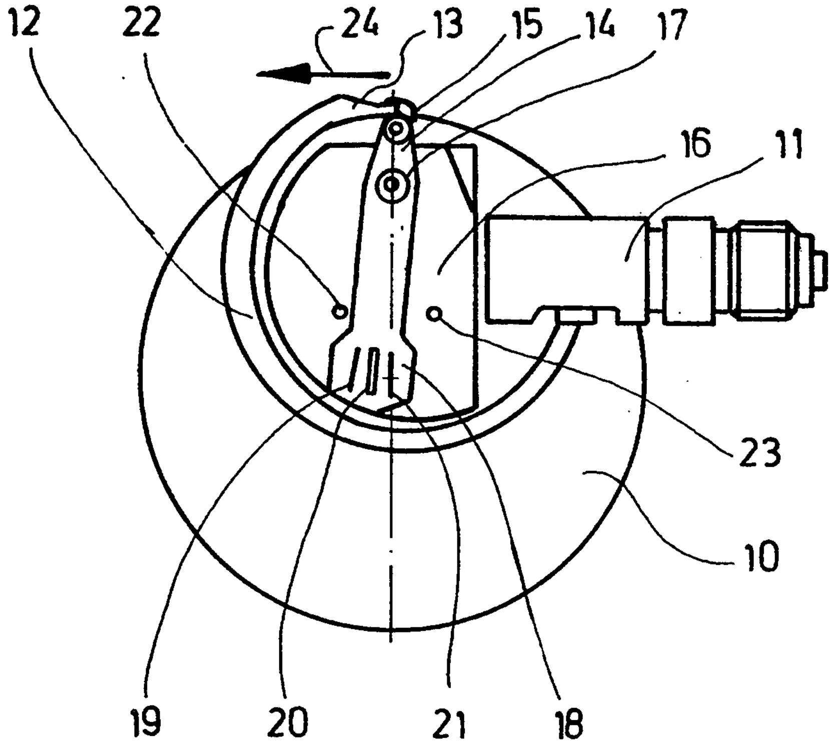
FIG. 1 shows a device according to the invention with a Bourdon tube, in plan view.

A slit carrier 10 is designed as a round plate and is disposed in the beam path of a mass spectrometer. Fixedly mounted on this is a connecting piece 11 for connection to a compressed air supply.

A Bourdon tube 12 acting as regulating unit is connected to the connecting piece 11. A free end 13 of the Bourdon tube is articulated to a lever 14 acting as gearing, specifically in the region of a lever end 15. The lever 14 is rotatably retained by means of a bearing 17 on the slit carrier 10 or on a plate 16 connected to the slit carrier 10.

In the present case, the lever 14 is designed as a two-armed lever. A lever end 18 opposite to the lever end 15 is further distant from the bearing 17 than the latter and at the same time carries three slits 19, 20, 21 of differing slit widths.

Abutments 22, 23 for limiting the movement of the lever 14 are disposed on the plate 16.

The mode of operation of the device is the following:

The Bourdon tube 12 is a curved tube which is open at one end and is known for the production of manometers. As the pressure in the Bourdon tube increases, this tube enlarges the area enclosed by the tube bend. In the present case, the Bourdon tube 12, lever 14, abutments 22, 23 and connecting piece 11 are disposed on the slit carrier 10 so that with atmospheric pressure in the Bourdon tube and with vacuum around the latter the position shown in FIG. 1 is applicable and the lever end 18 rests on the left-hand abutment 22. The slit carrier 10 is positioned in the beam path (point P, FIG. 2) so that the right-hand slit 21 lies precisely in the beam path. As the pressure in the Bourdon tube 12 declines, this tube springs back again.

Figure 2:
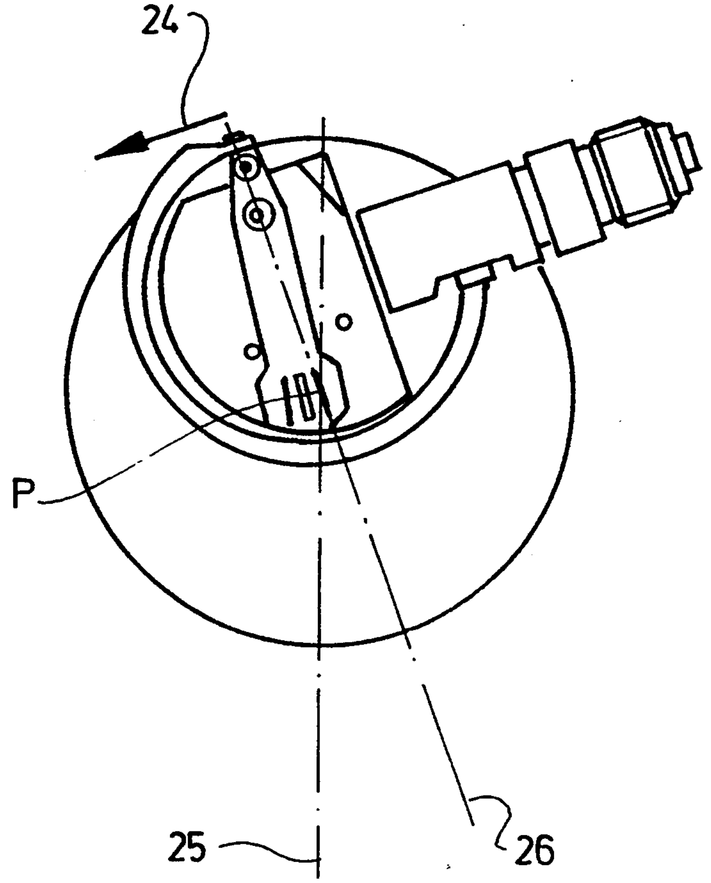
FIG. 2 shows the device according to FIG. 1 in a rotated position.

The slit 21 can be rotated in relation to the beam in the spectrometer. For the adjustment, the slit carrier 10 is retained so as to be rotatable about the beam axis, that is to say in the plane of the drawing. FIG. 2 shows a correspondingly rotated position of the slit carrier 10 after a rotation in the direction of the arrow 24. The fulcrum P is shown only in FIG. 2 and lies at the point of intersection of the two lines 25, 26 in the beam path of the spectrometer and thus precisely in the slit 21—with the lever end 18 resting on the opposite abutment 22.

As the pressure in the Bourdon tube 12 increases, this tube bends up, enlarging the enclosed area and moving the lever end 15 in the direction of the arrow 24. Depending upon the pressure which is present, the central slit 20 comes to lie in the beam path or even the left-hand slit 19. The precise positioning of the left-hand slit 19 is ensured by the right-hand abutment 23, on which the lever end 18 comes to lie at high pressure.

Figure 3:
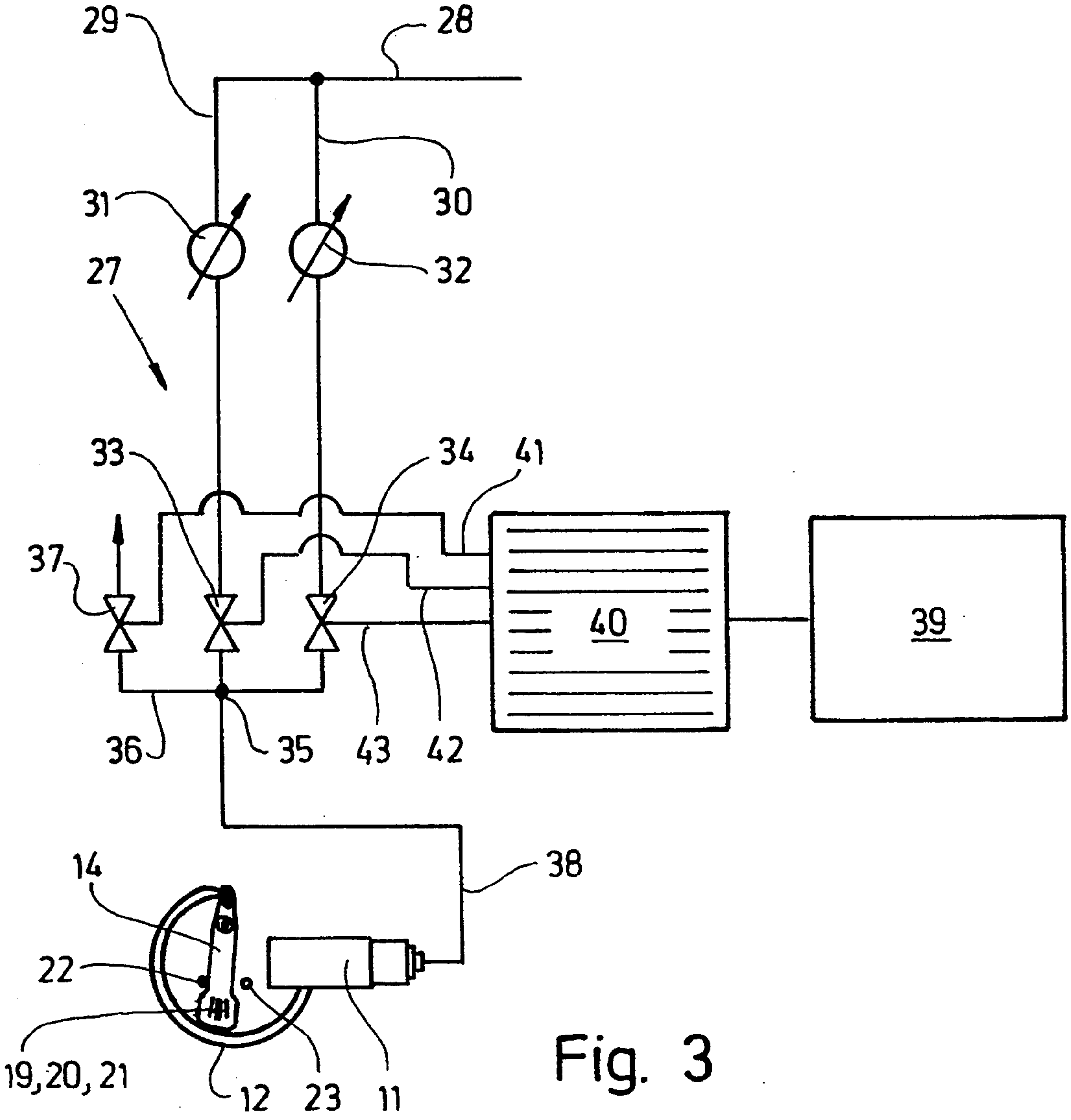
FIG. 3 shows a diagrammatic representation of a possibility for driving the device according to the invention.

FIG. 3 shows a possibility for driving the slit device. To this end, the connecting piece 11 is connected to a compressed air system 27. A compressed air supply takes place via the conduit 28. Conduits 29, 30 leading off therefrom are provided with regulating valves 31, 32, so that a moderate gas pressure is present at a valve 33 (conduit 29) and a maximum gas pressure is present at the actuating valve 34. On the output side of the valves 33, 34, the conduits 29, 30 lead to a junction point 35, which is connected via a conduit 36 and a corresponding actuating valve 37 to the external air and via a conduit 38 to the connecting piece 11. The actuating valves 33, 34, 37 are driven by a computer 39 via an interface 40. Corresponding control lines are designated by 41, 42 and 43.

When the valve 37 is open and the valves 33, 34 are closed, the position according to FIGS. 1 and 2 becomes established, that is to say, the right-hand slit 21 stands in the beam path. When the valves 33, 37 are closed and the valve 34 is open, the lever end 18 rests on the abutment 23 and the left-hand slit 19 stands in the beam path. The central slit 20 is effective as soon as the valves 37 and 34 are closed and a corresponding moderate gas pressure acts upon the Bourdon tube 12 via the valve 33.

Figure 4:
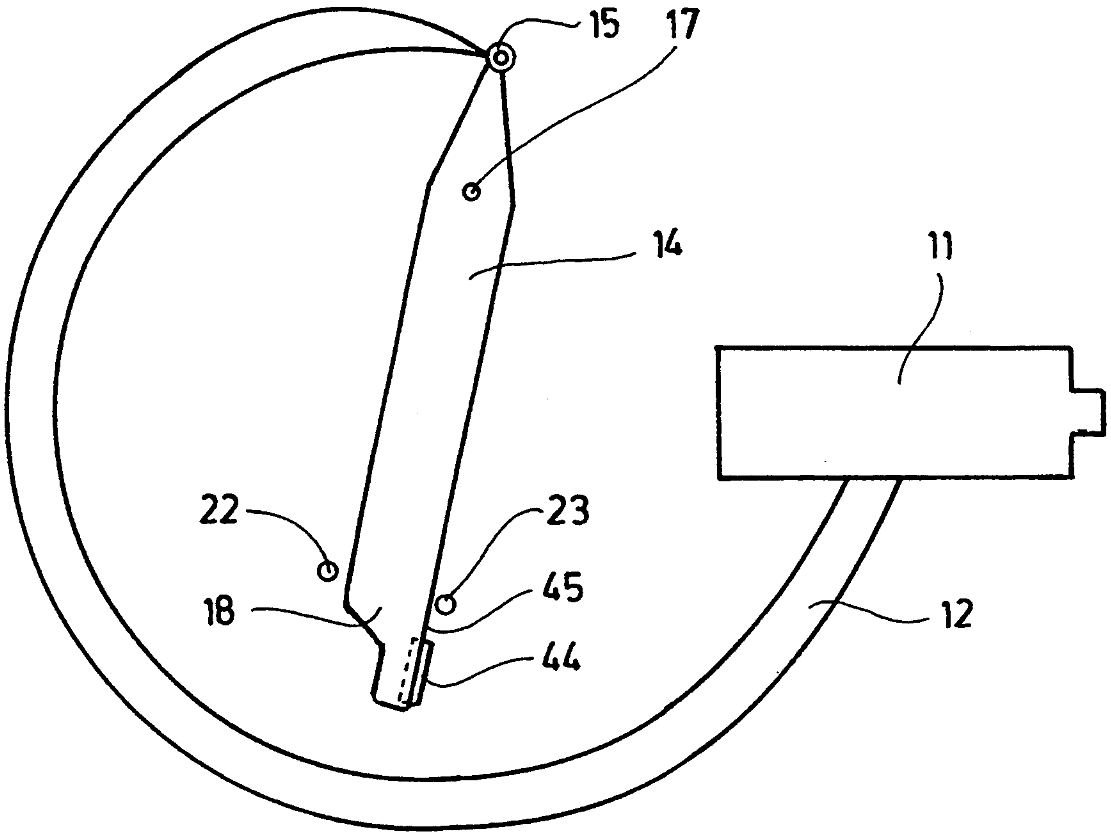
FIG. 4 shows a modification of the embodiment according to FIGS. 1 to 3.

FIG. 4 shows a modification of the previously described slit device. Here, an individual slit 44 is provided, the width of which is settable by an outer edge 45 of the lever 14. Thus, the lever 14 does not have the function of a carrier of a plurality of slits, but functions as an adjustable slit jaw. The slit 44 is for example diposed in that plate of the slit carrier 10 which is not shown in FIG. 4. In the case of a meterable compressed air supply, with this embodiment a continuous and delay-free alteration of the slit width is possible.

I claim:

1. Device for setting the slit widths of slit devices in the beam path of spectrometers, especially mass spectrometers, having a slit (44), the width of which is variable, or having selectively settable slits (19, 20,21) of differing widths, and having a gearing means for moving the slits or for setting the same, characterized in that a pneumatically actuable regulating unit (12) is associated with the gearing means.

2. Device according to claim 1, characterized in that in the regulating unit (12) a spring means acts against the pneumatic pressure.

3. Device according to claim 1 where said regulating unit (12) has an adjustment path which is set as a function of the pressure which is effective outside the regulating unit (external pressure).

4. Device according to claim 1, characterized in that the regulating unit (12) exhibits a hollow body which alters its form under pressure, especially a Bourdon tube (12), with a corresponding connecting piece (11) for the supply of compressed air.

5. Device according to claim 1, characterized in that the gearing means exhibits abutments (22, 23) for the definition of specified slit positions or slit widths, between which such gearing means is movable to and fro.

6. Device according to claim 1, characterized in that the regulating unit (12) is connected to a slit carrier (10), which is at the same time a retaining device for the gearing means.

7. Device according to claim 6, characterized in that the gearing means is designed as a lever (14), one end (18) of which exhibits in particular slits (19,20,21) of differing slit widths or carries a limitation (edge 45) of a slit (44) and the other end (15) of which can be acted upon by the regulating unit (12), and in that the lever (14) is mounted to be movable preferably on the slit carrier (10) especially between abutments (22, 23), so that when the lever (14) rests on an abutment a specified slit lies in the beam path or a specified slit width is set.

8. Device according to claim 6 or 7, characterized in that the slit carrier (10) disposed in the beam path of the spectrometer is rotatable in a plane transversely to the beam path, especially with a fulcrum (P) in the beam path.

* * * * *